No. 651,205. Patented June 5, 1900.
D. W. RAND.
KNOB ATTACHMENT.
(Application filed Feb. 15, 1900.)
(No Model.)

Inventor
D. W. Rand
by H. B. Willson & Co.
Attorneys

Witnesses

UNITED STATES PATENT OFFICE.

DANIEL W. RAND, OF DUBUQUE, IOWA.

KNOB ATTACHMENT.

SPECIFICATION forming part of Letters Patent No. 651,205, dated June 5, 1900.

Application filed February 15, 1900. Serial No. 5,286. (No model.)

*To all whom it may concern:*

Be it known that I, DANIEL W. RAND, a citizen of the United States, residing at Dubuque, in the county of Dubuque and State of Iowa, have invented certain new and useful Improvements in Door-Knob Attachments; and I do declare the following to be a full, clear, and exact description of the invention, such as will enable others skilled in the art to which it appertains to make and use the same.

The invention relates to door-knob attachments.

The object of the invention is to provide an attachment for door-knobs which may be easily and quickly engaged with the shanks of the knobs now in use and will serve to prevent the accidental unscrewing of the screw now commonly used for attaching the knob-shank to the spindle and which may be so adjusted while in place upon the shank as to uncover the head of the screw and permit it to be withdrawn when it is desired to remove the knob from the spindle.

With this object in view the invention consists in certain features of construction and combination of parts, which will be hereinafter set forth.

Figure 1:
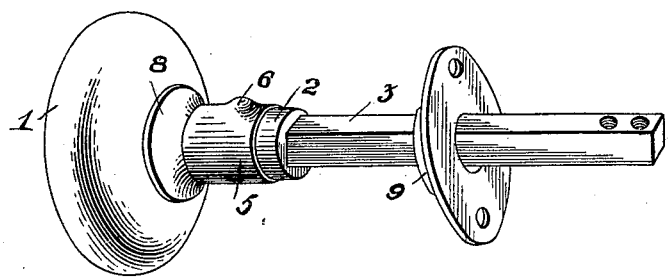
Figure 2:
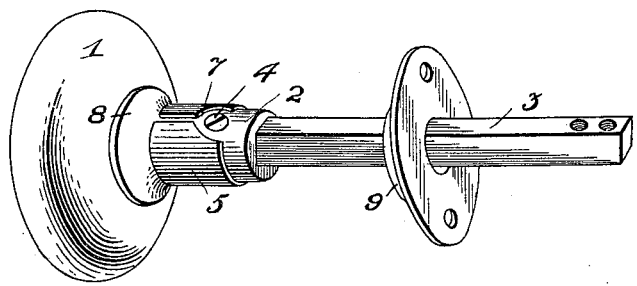
Figure 3:
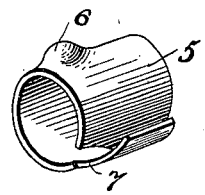

In the accompanying drawings, Figure 1 is a perspective view of a door-knob, illustrating the application of my invention and showing the attachment covering the fastening-screw. Fig. 2 is a similar view showing the fastening shifted or turned to a position to afford access to the screw for the purpose of removing it when it is desired to separate the knob from the spindle, and Fig. 3 is a detail perspective view of the attachment.

In the drawings the same reference characters indicate the same parts of the invention.

1 denotes the knob; 2, its shank; 3, its spindle, and 4 a screw used for connecting the shank to the spindle. These parts may all be of any well-known or approved construction.

5 denotes the attachment, which preferably consists of a split sleeve formed with a seat 6, preferably pressed from the body of the material and adapted to take over the head of the fastening-screw. One end of the sleeve is provided with a recess 7, which is in such position as to register with the head of the screw when the sleeve is shifted or turned around. The sleeve is placed upon the shank and snugly fits between the head 8 of the shank and the fastening-plate 9. When the sleeve is adjusted to bring its seat over the head of the fastening-screw, it will be impossible for the screw to work loose, and owing to the resilient nature of the material of which the attachment is formed it will bind sufficiently tight around the shank to prevent it accidentally rotating with respect to the shank and uncovering the head of the screw. Now if it be desired to remove the knob from the spindle by applying pressure to the sleeve its seat will be made to snap from engagement with the head of the fastening-screw, thus permitting the sleeve, which has been locked against the head of the screw against rotation, being now turned to bring its recess over or in register with the head of the screw, thus enabling the seat to be engaged with the head of the screw and permit the screw to be withdrawn.

From the foregoing description, taken in connection with the accompanying drawings, the construction, operation, and advantages of my improved door-knob attachment will be readily apparent without requiring an extended explanation. It will be seen that the device is simple of construction, that said construction permits of its manufacture at small cost, and that it is exceedingly well adapted for the purpose for which it is designed.

Various changes in the form, proportion, and the minor details of construction may be resorted to without departing from the principle or sacrificing any of the advantages of this invention.

Having thus fully described my invention, what I claim as new, and desire to secure by Letters Patent of the United States, is—

A knob attachment consisting of a split sleeve, one end of which at its adjacent edges is cut away to form a recess, and the side of which is provided with a bulged screw-head seat, said sleeve being adapted to be engaged with the shank of an ordinary door-knob, substantially as and for the purpose set forth.

In testimony whereof I have hereunto set my hand in presence of two subscribing witnesses.

DANIEL W. RAND.

Witnesses:
JOSEPH B. POWERS,
WILLIAM M. KRETSCHMER.